(12) United States Patent
Turek et al.

(10) Patent No.: US 11,230,460 B2
(45) Date of Patent: Jan. 25, 2022

(54) DRIVE BELT MONTORING FOR PASSENGER CONVEYORS

(71) Applicant: Otis Elevator Company, Farmington, CT (US)

(72) Inventors: Alexander Turek, Münchendorf (AT); Thomas Illedits, Vienna (AT)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 16/952,341

(22) Filed: Nov. 19, 2020

(65) Prior Publication Data

US 2021/0221649 A1     Jul. 22, 2021

(30) Foreign Application Priority Data

Jan. 21, 2020   (EP) ..................................... 20152961

(51) Int. Cl.
    *B66B 25/00*         (2006.01)
    *B66B 21/04*         (2006.01)
    *B66B 23/02*         (2006.01)
    *B66B 27/00*         (2006.01)
    *G01M 13/023*       (2019.01)
    *G01M 13/028*       (2019.01)

(52) U.S. Cl.
CPC ............ *B66B 25/006* (2013.01); *B66B 21/04* (2013.01); *B66B 23/02* (2013.01); *B66B 27/00* (2013.01); *G01M 13/023* (2013.01); *G01M 13/028* (2013.01)

(58) Field of Classification Search
CPC ....... B66B 29/00; B66B 25/00; B66B 25/006; B66B 21/04; B66B 23/02; B66B 27/00; G01M 13/023; G01M 13/028

USPC .......................................... 198/322, 323, 330
See application file for complete search history.

(56) References Cited

U.S. PATENT DOCUMENTS 5,785,165 A *   7/1998   Stahlhut .................. B66B 25/00
                                                           198/322
6,267,219 B1 *   7/2001   Spannhake ............. B66B 27/00
                                                           198/323

(Continued)

FOREIGN PATENT DOCUMENTS

| EP | 2774886 | * | 9/2014 | ............. B66B 11/04 |
| EP | 3556699 | * | 10/2019 | ............... B66B 1/34 |
| WO | 2016069734 A1 | | 5/2016 | |

OTHER PUBLICATIONS

European Search Report for application EP 20152961.7, dated Jul. 24, 2020, 9 pages.

*Primary Examiner* — James R Bidwell
(74) *Attorney, Agent, or Firm* — Cantor Colburn LLP (57) ABSTRACT

A drive belt monitoring system for a passenger conveyor (10) is provided having a drive belt (30) having at least one cord (36) extending longitudinally within the drive belt (30). The monitoring system (50) includes: a first sensor (52) configured to measure the pretension of the drive belt (30); a second sensor (54) configured to determine a passenger load on the drive belt (30); a third sensor (56) configured to determine the resonance frequency of the drive belt (30); and a controller (60) configured to evaluate a condition of the drive belt (30) based on: the measured pretension of the drive belt (30), the determined passenger load of the drive belt (30), and the determined resonance frequency of the drive belt (30).

16 Claims, 6 Drawing Sheets

(56) References Cited

U.S. PATENT DOCUMENTS

| | | | |
|---|---|---|---|
| 6,892,874 B2 * | 5/2005 | Pietz | B66B 23/022 |
| | | | 198/322 |
| 2012/0043180 A1 * | 2/2012 | Braasch | B66B 25/006 |
| | | | 198/322 |
| 2018/0244502 A1 * | 8/2018 | Henkel | H02P 27/045 |
| 2019/0084807 A1 * | 3/2019 | Nelson | B66B 27/00 |

* cited by examiner

DRIVE BELT MONTORING FOR PASSENGER CONVEYORS

FOREIGN PRIORITY

This application claims priority to European Patent Application No. 20152961.7, filed Jan. 21, 2020, and all the benefits accruing therefrom under 35 U.S.C. § 119, the contents of which in its entirety are herein incorporated by reference.

TECHNICAL FIELD

This disclosure relates to systems and methods for monitoring drive belts for passenger conveyors, such as escalators or moving walkways.

BACKGROUND

Conventional passenger conveyors, such as escalators and moving walkways, generally comprise a transportation band, on which passengers stand, which is propelled by a drive system to convey the passengers from one place to another place, for example between floors of a building or along extended distances.

The transportation band comprises a plurality of conveyance elements, such as steps or pallets, which are drivingly coupled to at least one drive member, such as a drive belt. The drive belt moves along a conveyance path, around a first turnaround portion, returns inside a balustrade (or associated support structure) following a return path and then around a second turnaround portion. A drive pulley, driven by a drive motor, is generally provided at one of the turnaround portions to drive the drive belt.

The drive belt generally comprises an endless belt with one or more embedded steel cords extending longitudinally within the endless belt to provide the required strength. Based on the length and the rise of the passenger conveyor, a minimum belt breaking strength is defined. The number and arrangement of cords within the drive belt is determined to achieve the required belt breaking strength.

During operation of the passenger conveyor, the drive belt is worn due to repeated engagement with the drive pulley, bending during movement through the turnaround points and passenger loads. This can cause wires within the steel cords to wear and eventually break, which reduces the belt breaking strength. Reduction in breaking strength can lead to failure of the drive belt, which may result in the passenger conveyor being out of operation until a repair can be carried out and in certain circumstances could even lead to damage of other components of the passenger conveyor and even possibly injury of passengers.

Since the cords are embedded within the drive belt, they are not visible during operation of the conveyor. Generally, a visual inspection of the drive belt is the only way to try to check the condition of a drive belt. Whilst the external surfaces of the drive belt can be inspected when the passenger conveyor is not in operation, it is not possible to internally inspect the drive belts in order to evaluate the condition of the embedded cords.

The first sign that a drive belt is worn internally is often when it fails. Following failure of a drive belt, the passenger conveyor must remain out of service until the drive belt is replaced.

Therefore, belt manufacturers normally define a maximum lifespan for a given drive belt, which could be defined in terms of operational life (e.g. 25.000 h) and/or number of operational cycles. Once this maximum lifespan is reached, the manufacturer recommends that the drive belt should be replaced to avoid the risk of belt failure. The maximum lifespan is generally defined to be very short because it is determined for short drive belts with a span of 1 or 2 m and not for conveyor belts which typically can have a length of 80 m. Currently, it is not possible to accurately calculate or predict the lifespan of a toothed belt in passenger conveyor applications.

Therefore, there is a need to provide reliable monitoring for passenger conveyor drive belts.

SUMMARY

According to a first aspect of this disclosure, there is provided a drive belt monitoring system for a passenger conveyor having a drive belt having at least one cord extending longitudinally within the drive belt; wherein the monitoring system comprises: a first sensor configured to measure the pretension of the drive belt; a second sensor configured to determine a passenger load on the drive belt; a third sensor configured to determine the resonance frequency of the drive belt; and a controller configured to evaluate a condition of the drive belt based on: the measured pretension of the drive belt the determined passenger load of the drive belt, and the determined resonance frequency of the drive belt.

The drive belt monitoring system is able to continuously monitor the condition of the drive belt during operation. By monitoring the drive belt condition, it is possible to identify when the condition of a drive belt deteriorates and the extent of the deterioration. Data relating to the drive belt condition can be used to plan repair and maintenance of the passenger conveyor.

The first sensor may be a force sensor. The first sensor may be a load cell. The first sensor may be provided at a tension carriage of the passenger conveyor. The first sensor may be provided at a first landing region of the passenger conveyor.

The drive belt may be driven by at least one drive motor. The at least one drive motor may drive a drive pulley, which engages with and drives the drive belt.

The second sensor may be provided at a drive system of the passenger conveyor. The second sensor may be provided at a main drive shaft, or a machine shaft of the passenger conveyor. The second sensor may be configured to measure the torque on a main drive shaft of the passenger conveyor. The second sensor may be configured to measure the total torque on the drive system. The second sensor may be a torque sensor. The second sensor may be configured to measure the power consumption of a drive motor of the passenger conveyor. The second sensor may be provided at the drive motor. When two or more drive motors are provided, the second sensor may be configured to measure the total power consumption of the drive motors. The second sensor may be provided at the drive system.

The third sensor may be configured to measure disturbances in the air surrounding the drive belt due to vibration of the drive belt. The third sensor may be an infrared sensor. The third sensor may be an acoustic sensor. The third sensor may be provided adjacent to the drive belt along a conveyance path of the drive belt. The third sensor may be mounted on a truss of the passenger conveyor, adjacent to the drive belt. The third sensor may be mounted adjacent to a lower surface of the drive belt. The third sensor may be provided at an upper transition region of the passenger conveyor. The third sensor may be provided in the upper landing region. The third sensor may be provided along a return path of the drive belt.

The sensors may be configured for wireless communication with the controller. The sensors may be configured to continuously transmit data to the controller during operation of the passenger conveyor. The sensors may be configured to transmit data to the controller during operation of the passenger conveyor at regular intervals.

The controller may be configured to determine a current belt breaking strength of the drive belt. The controller may be configured to determine whether the current belt breaking strength is below a predetermined level or threshold. In other words, the controller may be configured to determine whether the current belt breaking strength is below a minimum threshold for belt breaking strength. The controller may be configured to generate an alert if the current belt breaking strength is below a predetermined level. The controller may be configured to determine if the current belt breaking strength is unsafe, i.e. if the current belt breaking strength is below a predetermined unsafe threshold. If an unsafe drive belt condition is determined, the controller may be configured to halt operation of the passenger conveyor. In other words, the controller may be configured to determine if the degree of wear of the drive belt is unsafe and if such a condition is determined, the controller may halt operation of the passenger conveyor.

The controller may include a data storage device to record the measurements. The controller may include a device that stops the escalator if a certain wearing stage is exceeded.

The drive belt monitoring system may further comprise a control station, which could be located remotely from the drive belt monitoring system. The monitoring system may further comprise at least one user device. The drive belt monitoring system may further comprise a control station and/or at least one user device. The user device may be a portal user device, such as a smart phone, tablet, laptop or computer. The controller may be configured to send a wireless signal to the at least one user device. The control station may be configured to communicate with one or more user devices, such as a smart phone, tablet, laptop or computer. The controller may include a LAN/WLAN connection to provide live data to one or more user devices.

The controller may be configured to send a wireless signal to a control station remotely located from the monitoring system. The controller may be configured to send a wireless signal to a control station, either directly or via a cloud computing system. The controller may include a LAN/WLAN connection to provide live data to the remote control station. The control station may be a service centre at a manufacturer facility or a customer facility.

The control station may receive information from the monitoring system, collate the information and analyse in order to, for example, establish trends, predict the failure of the drive belt and/or calculate the remaining operational life of the drive belt.

The controller may be further configured to transmit the condition of the drive belt to the control station. The controller may be further configured to transmit the condition of the drive belt to the at least one user device. The controller may be further configured to transmit data relating to the belt breaking strength to the control station and/or the at least one user device.

Alternatively, the controller may be an integral part of control station, or the at least one user device. In this case, the data from the sensors is transmitted to the control station (or the at least one user device), where the evaluation of the condition of the drive belt is carried out.

The control station may be configured to use the data from the drive belt monitoring system as an input to a predictive maintenance system, such as Condition Based Maintenance (CBM). The information from the drive belt monitoring system may be used with other sensor data from the passenger conveyor in a predictive maintenance system. The information from the drive belt monitoring system may be used with other sensor data from the passenger conveyor for Condition Based Maintenance.

According to a further aspect of this disclosure, there is provided a passenger conveyor comprising: a transportation band for conveying passengers between a first landing region and a second landing region, at least one drive belt on which the transportation band is mounted, the drive belt being driven by at least one drive motor; and a drive belt monitoring system as described above.

The passenger conveyor may be an escalator and the conveyance elements may be steps. The passenger conveyor may be a moving walkway and the conveyance elements may be pallets.

The first sensor may be provided at a tension carriage of the drive belt. The first sensor may be provided at a tension carriage at either the first or second landing region. The first sensor may be a force sensor. The first sensor may be a load cell.

The second sensor may be provided at a main drive shaft of the passenger conveyor. The second sensor may be configured to measure the torque on the main drive shaft. The second sensor may be configured to measure the total torque on the drive system of the passenger conveyor. The second sensor may be provided at the at least one drive motor of the passenger conveyor. When one drive motor is provided, the second sensor may be configured to measure the power consumption of the drive motor. When two or more drive motors are provided, the second sensor may be configured to measure the total power consumption of the drive motors. The second sensor may be a torque sensor provided at a main drive shaft of the passenger conveyor.

The third sensor may be configured to measure disturbances in the air surrounding the drive belt due to vibration of the drive belt. The third sensor may be an infrared sensor or an acoustic sensor. The third sensor may be provided adjacent to the drive belt along a conveyance path of the drive belt. The third sensor may be provided at an upper transition region of the passenger conveyor. The third sensor may be mounted on a truss of the passenger conveyor, adjacent to the drive belt. The third sensor may be mounted adjacent to a lower surface of the drive belt. The third sensor may be provided between adjacent rollers in an upper transition region of the passenger conveyor. The third sensor may be provided in the upper landing region. The third sensor may be provided along a return path of the drive belt.

The passenger conveyor may comprise a plurality of drive belts, wherein each drive belt is provided with a respective drive belt monitoring system. The passenger conveyor may comprise two drive strands, each drive strand comprising at least two drive belts; wherein each of the plurality of conveyance elements is mounted to the two drive strands. In such an arrangement, each drive belt is provided with a respective drive belt monitoring system.

Each drive belt may be provided with a respective third sensor mounted adjacent to the respective drive belt. The location of each third sensor may be determined individually in accordance with the geometry of the passenger conveyor. In other words, the third sensor location for each drive belt can be different.

A common first sensor may be provided, which functions as the first sensor for each drive belt monitoring system. Alternatively, a respective first sensor can be provided for each drive belt. If different pretension is applied to the plurality of drive belts, it may be appropriate to provide multiple first sensors A common second sensor may be provided, which functions as the second sensor for each drive belt monitoring system. The common second sensor may be configured to measure the total power consumption of the drive motor(s) of the passenger conveyor. The common second sensor may be configured to measure the total torque on the drive system of the passenger conveyor.

According to a further aspect, there is provided a method for monitoring a drive belt of a passenger conveyor, the method comprising: measuring a pretension of the drive belt; determining a passenger load on the drive belt; determining the resonance frequency of the drive belt; evaluating a condition of the drive belt based on: the measured pretension of the drive belt, the determined passenger load, and the determined resonance frequency of the drive belt.

The step of measuring a pretension of the drive belt may comprise measuring the pretension force in a tension carriage of the passenger conveyor. The step of measuring a pretension of the drive belt may comprise measuring the pretension force with a force sensor. The step of measuring a pretension of the drive belt may comprise measuring the pretension force with a load cell.

The step of determining a passenger load on the drive belt may comprise determining the torque in a main drive shaft of the passenger conveyor. The step of determining a passenger load on the drive belt may comprise determining the torque in a main drive shaft of the passenger conveyor with a torque sensor. The step of determining a passenger load on the drive belt may comprise measuring the power consumption of a drive motor of the passenger conveyor. The step of determining a passenger load on the drive belt may comprise measuring the total power consumption of the drive motor(s) of the passenger conveyor.

The step of determining a resonance frequency of the drive belt may comprise measuring disturbances in the air surrounding the drive belt due to vibration of the drive belt. The method may comprise storing frequency data relating to the resonance frequency of the drive belt, thereby providing historical resonance frequency data. The step of determining the resonance frequency of the drive belt may comprise determining a current resonance frequency, and comparing the current resonance frequency with historical resonance frequency data.

The step of evaluating a condition of the drive belt may further comprise determining a current belt breaking strength of the drive belt. The step of determining a condition of the drive belt may further comprise determining whether the current belt breaking strength is below a predetermined level (or threshold). The step of determining a condition of the drive belt may further comprise generating an alert if the current belt breaking strength is below a predetermined level. The controller may determine if the current belt breaking strength is unsafe, i.e. if the current belt breaking strength is below a second predetermined threshold (an unsafe threshold). If an unsafe drive belt condition is determined, the controller may halt operation of the passenger conveyor. In other words, the controller may determine if the degree of wear of the drive belt is unsafe and if such a condition is determined, the controller may halt operation of the passenger conveyor. The controller may record the measurement data in a data storage.

The method may further comprise transmitting the evaluated condition of the drive belt to a remote control station and/or a user device. The method may further comprise data relating to the belt breaking strength of the drive belt to a remote control station and/or a user device.

The method may further comprise transmitting data from one or more of the sensors of to a remote control station and/or a user device.

Features described in relation to the first aspect of the present disclosure may of course also be applied to the further aspects, and vice versa. In general, features of any example described herein may be applied wherever appropriate to any other example described herein. Where reference is made to different examples or sets of examples, it should be understood that these are not necessarily distinct but may overlap.

The system and method described are able to provide continuous monitoring and evaluation of the condition of the drive belt on a passenger conveyor. The condition of the drive belt can be monitored over time to obtain a picture of the wearing of the drive belt. The data can be analysed to provide an estimate of the current condition (i.e. the amount of wear) of the drive belt, and to predict an expected remaining operational life of the drive belt. Based on these predictions, drive belt maintenance and repair can be scheduled at convenient times, thereby avoiding unexpected down time for the passenger conveyor. Replacement of a drive belt can be accurately scheduled such that the drive belt is replaced before it fails. This means that the number of field visits can be reduced, which results in lower operational and service costs.

The data from the sensors of the drive belt monitoring system can also be used to identify other issues with the passenger conveyor, such as inaccurate setting of components such as the pulley or tension carriage. Further by continuously monitoring the pretension on the drive belt, the pretension applied to the drive belt can be adjusted and optimised to provide energy efficiency improvements. Optimisation of the pretension applied to the drive belt can reduce wear on the drive belt and increase service life.

Since the components of the drive belt monitoring system are not integrally formed with the other components of the passenger conveyor, they can be easily incorporated into new passenger conveyors or retrofitted into existing passenger conveyors.

Further, the monitoring system and method described provide a low cost and high accuracy solution. This means that monitoring systems can be provided for each drive belt on a passenger conveyor.

The monitoring system and monitoring method described can be used in Condition Based Maintenance (CBM) processes to determine health level parameters of the passenger conveyor and predict maintenance and/or repair schedules. The monitoring system and monitoring method described can be used in conjunction with other known sensors and monitoring systems provided on other components of the passenger conveyor.

DRAWING DESCRIPTION

Certain examples of this disclosure will now be described, by way of example only, and with reference to the accompanying drawings, in which.

DETAILED DESCRIPTION

Figure 1:
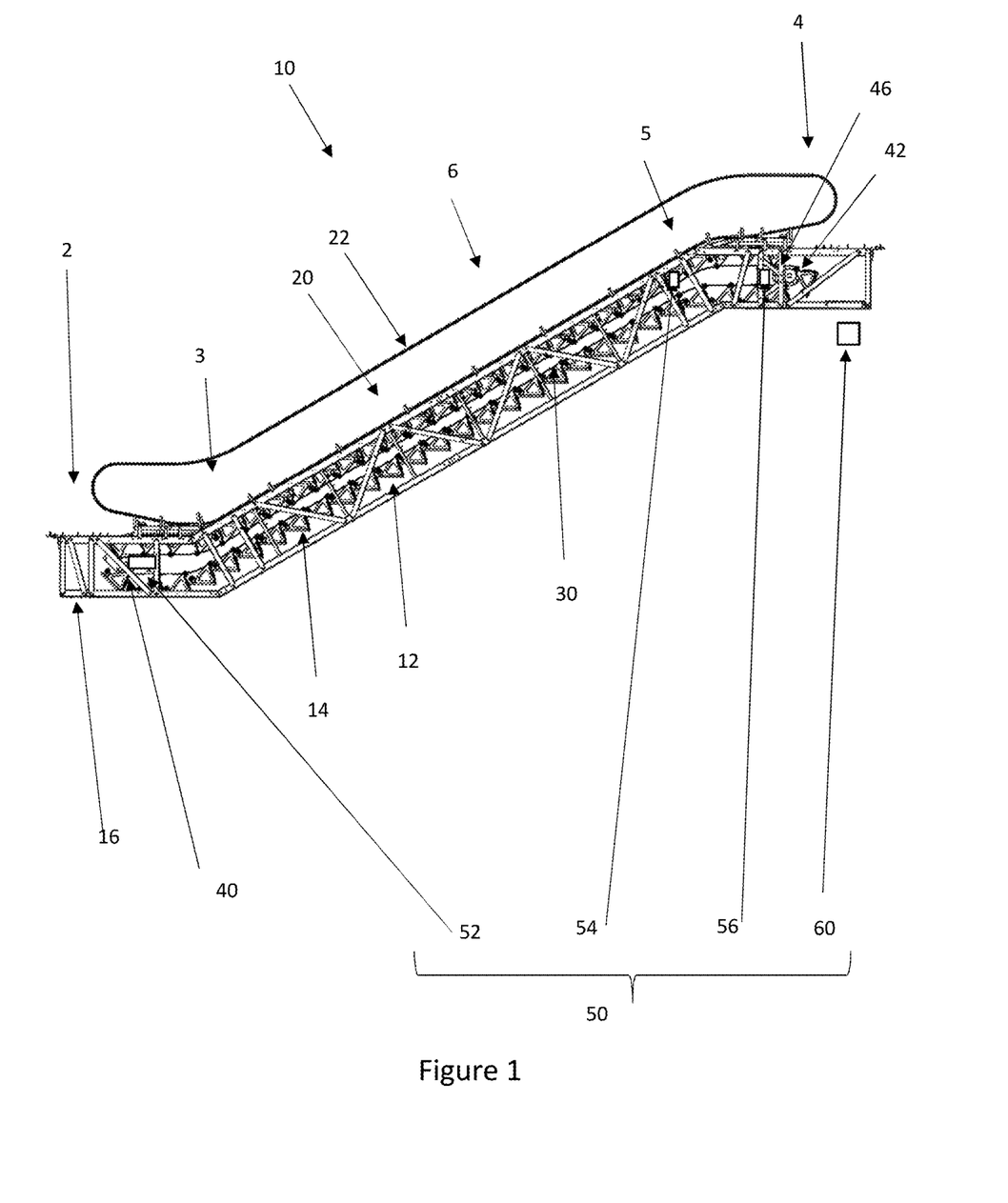
FIG. 1 shows a passenger conveyor according to an example of the present disclosure.

FIG. 1 shows a passenger conveyor 10, represented in this figure as an escalator, on which passengers are transported on a transportation band 12 between a first landing region 2 and a second landing region 4. A truss 16 extends between the first landing region 2 (also referred to as a lower landing region) and the second landing region 4 (also referred to as an upper landing region). Balustrades 20 which each support a moving handrail 22 extend along each side of the passenger conveyor 10.

The transportation band 12 of the passenger conveyor 10 is formed of a plurality of conveyance elements 14 (escalator steps). The plurality of conveyance elements 14 are mounted on a drive belt 30. The conveyance elements 14 travel along guide rails 18 (which can be seen more clearly in FIGS. 3 and 4) which are mounted on the truss 16. The passenger conveyor 10 includes an upper transition region 5, which is the region between an inclined section 6 and the second landing region 4; and a lower transition region 3, which is the region between the first landing region 2 and the inclined section 6. A plurality of rollers 38 are provided on the guide rails 18 in the upper transition region 5.

Figure 2:
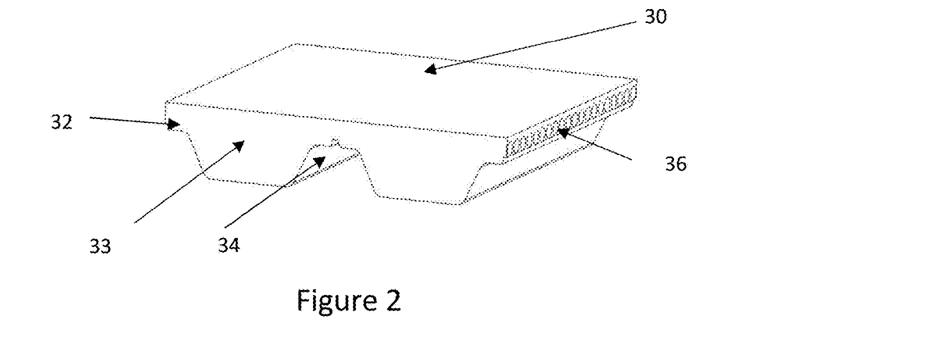
FIG. 2 shows a cross-sectional view of an exemplary drive belt according to an example of the present disclosure.

As shown in FIG. 2, the drive belt 30 comprises an endless belt 32 having alternating teeth 33 and grooves 34 which extend across the belt width. Embedded steel cords 36 extend longitudinally within the endless belt 32.

Figure 3:
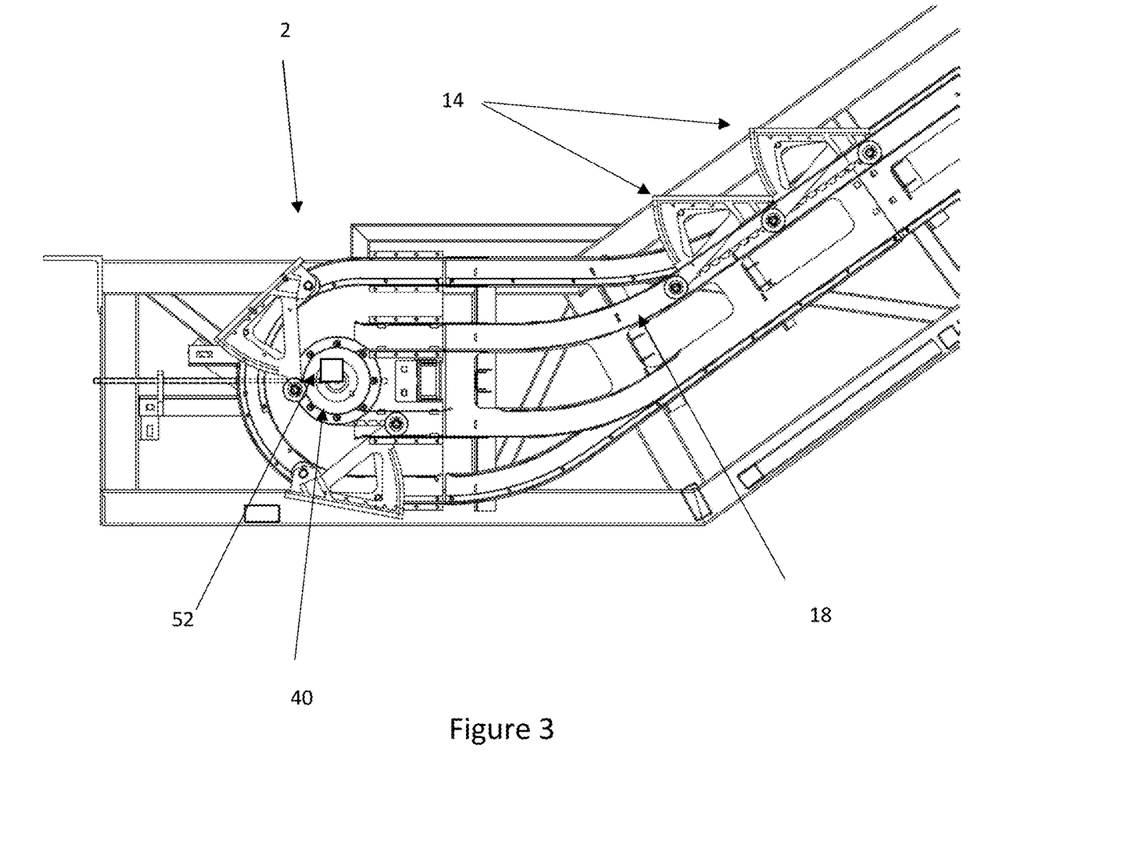
FIG. 3 shows a view of a lower region of the passenger conveyor of FIG. 1.

A tension carriage 40 is provided in the first landing region 2. As shown in FIG. 3, the tension carriage 40 maintains even tension on the drive belt 30 in order to ensure smooth and even operation of the transportation band 12. A certain pretension is required in relation to the drive torque to ensure a proper engagement of the drive belt teeth 33 and efficient force transmission from the drive pulley 42 to the drive belt 30.

Figure 4:
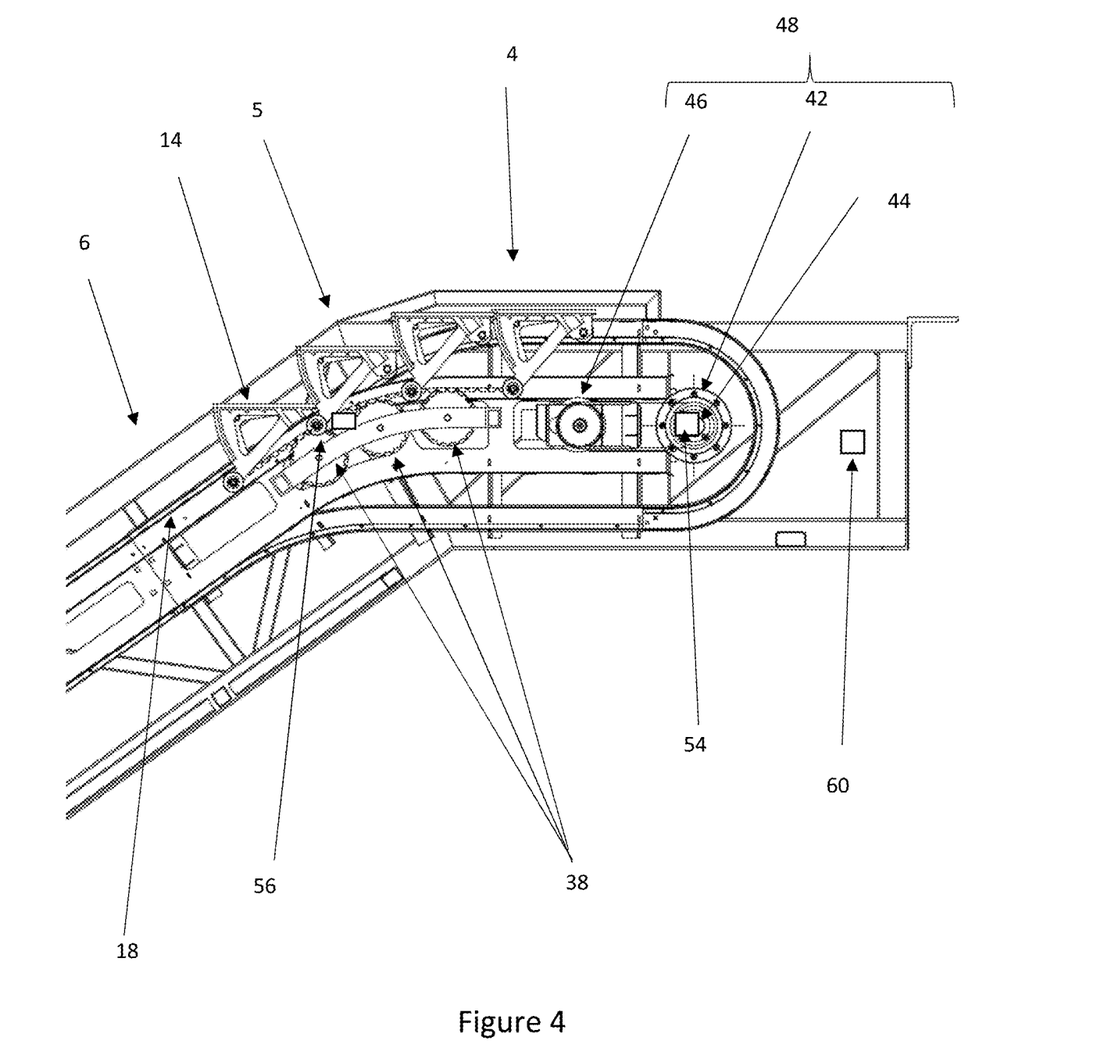
FIG. 4 shows a view of an upper region of the passenger conveyor of FIG. 1.

As shown more clearly in FIG. 4, the drive belt 30 is driven by a drive system 48 provided in the second landing region 4. The drive system 48 includes a drive pulley 42 having a drive shaft 44 which is driven by a drive motor 46. The drive belt 30 engages with and is driven by the drive pulley 42. FIG. 4 shows an exemplary drive system 48. However, it will be appreciated that other drive system arrangements may be provided for driving the drive belt 30.

A drive belt monitoring system 50 includes a first sensor 52, a second sensor 54, a third sensor 56 and a controller 60. The sensors 52, 54, 56 communicate wirelessly with the controller 60.

The first sensor 52 is mounted on the tension carriage 40, and measures the pretension applied to the drive belt 30. The measured pretension data is transmitted to the controller 60.

The first sensor 52 is preferably a load cell, but it will be appreciated that any suitable sensor for measuring the pretension can be used.

The second sensor 54 is located in the second landing region 4 and it provides data for determining the passenger load on the drive belt 30. The second sensor 54 may be a torque sensor mounted on a drive shaft 44 of the drive pulley 42. Alternatively, the second sensor 54 may measure the power consumption of the drive motor 46.

The third sensor 56 determines the resonance frequency of the drive belt 30 by measuring disturbances in the air surrounding the drive belt 30 due to vibration of the drive belt 30. The third sensor 56 may be an acoustic sensor, an infrared sensor, or any other suitable sensor.

The third sensor 56 is mounted on the truss 16 adjacent to the drive belt 30 in the upper transition region 5. The third sensor 56 is mounted between adjacent rollers 38. The rollers 38 support the drive belt 30 in the upper transition region 5, which is where the drive belt 30 is subjected to the highest loads. In the example shown, the rollers 38 are pulleys with teeth which engage with the drive belt teeth 33. In other examples (not shown), smooth rollers are provided, i.e. without teeth.

At the upper transition region 5 of the passenger conveyor 10, the maximum passenger load is applied to the drive belt 30, i.e. the passenger load is equivalent to the passenger load determined at the drive system 48 by the second sensor 54. Therefore, the evaluation of the condition of the drive belt 30 is simplified when the third sensor 56 is provided in the upper transition region 5.

Whilst in this example, the third sensor 56 is located in the upper transition region 5, it will be appreciated that the third sensor 56 may be located at any suitable position adjacent to the drive belt 30. For example, it may be necessary to locate the third sensor 56 at an alternative location due to restricted access or lack of free space in the upper transition region 5.

In the example of FIG. 4, the controller 60 is depicted as being located in the upper landing region 4. However, it will be appreciated that the controller 60 could be located at any suitable location on or near the passenger conveyor 10.

The sensors 52, 54, 56 of the drive belt monitoring system 50 operate continuously during operation of the passenger conveyor 10. The sensors 52, 54, 56 can transmit data continuously, or at regular time intervals to the controller 60.

Figure 5:
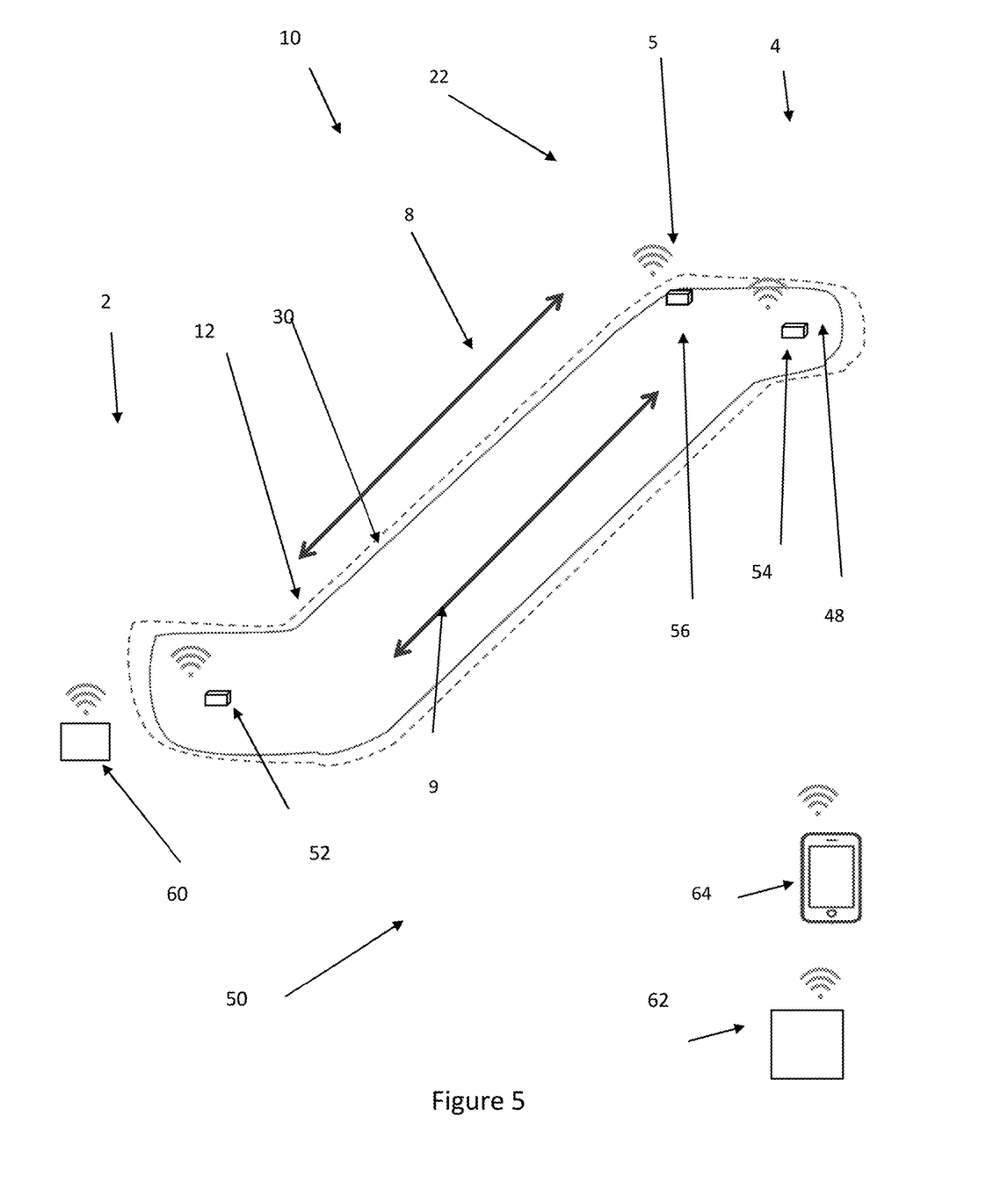
FIG. 5 shows a schematic representation of a monitoring system according to an example of the present disclosure.

FIG. 5 shows a generic representation of a passenger conveyor 10, which could be an escalator or a moving walkway. FIG. 5 is a simplified, cross-sectional representation which highlights the moving components which move along a conveyance path 8 and back along a return path 9.

The passenger conveyor 10 includes a transportation band 12 (dashed line), a moving handrail 22, a drive belt 30, a drive system 48 and a drive belt monitoring system 50. The passenger conveyor 10 includes other generic components as described above, but for ease of explanation not all are shown.

The sensors 52, 54 and 56 are configured for wireless communication with the controller 60. The sensors 52, 54 and 56 are provided with a power source, for example, a battery, or include an energy harvesting module.

The third sensor 56 is mounted adjacent to an upper portion of the drive belt 30, in other words it is mounted adjacent to the drive belt 30 travelling along the conveyance path 8. The third sensor 56 is mounted adjacent to a lower surface of the drive belt 30.

It will be appreciated that the third sensor 56 may be located in any location where it can be positioned so that it can reliably and accurately measure the resonance frequency of the drive belt 30. The variation of the passenger load on the drive belt 30 along a conveyance path 8 of the drive belt 30 can be determined from the known geometry of the passenger conveyor 10. Therefore, the passenger load at the location of the third sensor 56 can be determined relative to the passenger load determined at the drive system 48 by the second sensor 54. For example, the third sensor 56 may be located above the upper transition region 5, in the upper landing region 4 or along the return path 9 of the drive belt 30, and the load distribution of the passengers can be determined at the position of the third sensor 56.

In another example (not shown in the figures), the third sensor 56 is located in the horizontal upper landing region 4 between a transition radius and the drive pulley 42 engagement.

In FIG. 5, the controller 60 is located in the first landing region 2. However, it will be appreciated that the controller could be located at any suitable location on or near the passenger conveyor 10.

The controller 60 is configured for wireless communication with a control station 62, which may be located remotely from the passenger conveyor 10. The control station 62 is configured to communicate with one or more user devices 64. It is understood that a user device 64 may be a smart phone, tablet, laptop or computer. Alternatively or additionally, the controller 60 is configured to communicate wirelessly with the one or more user devices 64. It will be appreciated that the controller 60 could be part of the control station 62.

For example, the controller 60 can be configured to electronically communicate with a cloud computing network via a network interface device. The network interface device includes any communication device (e.g., a modem, wireless network adapter, etc.) that operates according to a network protocol (e.g., Wi-Fi, Ethernet, satellite, cable communications, etc.) which establishes a wired and/or wireless communication with a cloud computing network.

During operation of the passenger conveyor 10, the drive belt monitoring system 50 is operated continuously to provide up to date data relating to the condition of the drive belt 30.

In a further example, the plurality of conveyance elements 14 are mounted on a pair of drive belts 30. In this case, a drive belt monitoring system 50 is provided for each drive belt 30 which allows the condition of each drive belt 30 to be monitored separately. This means that the wear in each drive belt 30 can be monitored separately, and appropriate repair and maintenance can be scheduled as appropriate for the individual drive belt 30. In order to provide individual drive belt monitoring, each drive belt 30 is provided with a respective third sensor 56. However, a common first sensor 52 and a second sensor 54 can be provided to reduce complexity and keep cost down. For example, if the two drive belts 30 are driven by the same drive motor 46, a common second sensor 54 can be provided in the common drive shaft 44 or common drive motor 46. It may also be appropriate to provide a common first sensor 52.

Figure 6:
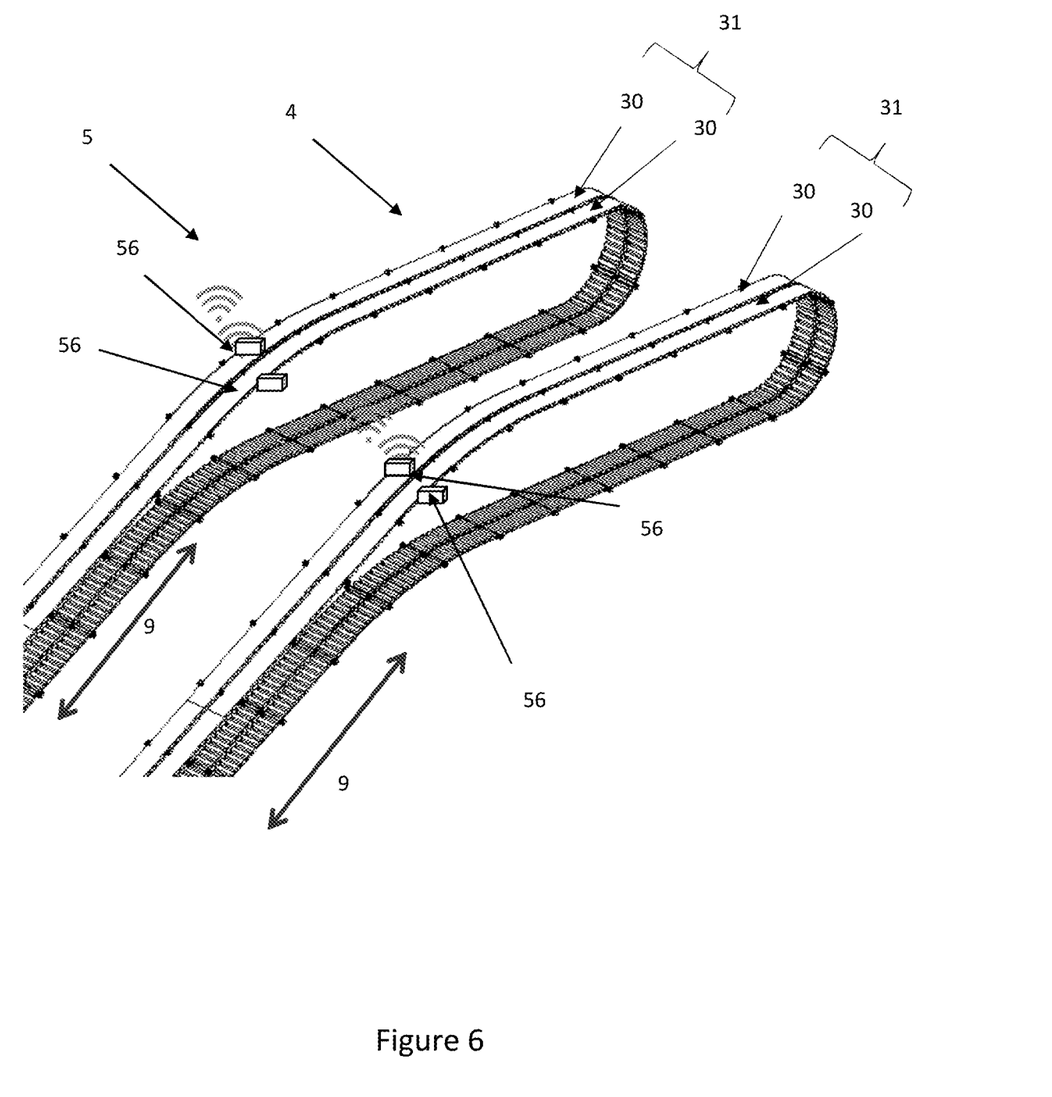
FIG. 6 shows a schematic representation of an exemplary method of the present disclosure.

FIG. 6 shows an arrangement with two drive strands 31 comprising two drive belts, on which conveyance elements 14 of a passenger conveyor 10 can be mounted. For ease of understanding, other components of the passenger conveyor 10 are not shown. Each drive belt 30 is provided with a drive belt monitoring system 50. Each drive belt 30 is provided with a respective third sensor 56. In the example shown, all of the third sensors 56 are shown schematically as being provided in the upper transition region 5. However, the third sensors 56 can be provided in any suitable position in the upper transition region 5, the upper landing region 4 or along the return path 9 of the respective drive belt 30 (as outlined above). It will be appreciated that the position of each third sensor 56 is independent of the other third sensors 56. For example, it will be necessary to take into account the location of other components in the passenger conveyor 10. With a drive system 48 comprising multiple drive motors 46, a common second sensor 54 can be provided. It may also be appropriate to provide a common first sensor 52.

In further examples, the plurality of conveyance elements 14 are mounted on two drive strands 31, each drive strand 31 comprising three or more drive belts 30. With this type of drive arrangement, a drive belt monitoring system 50 can be provided for each drive belt 30.

Figure 7:
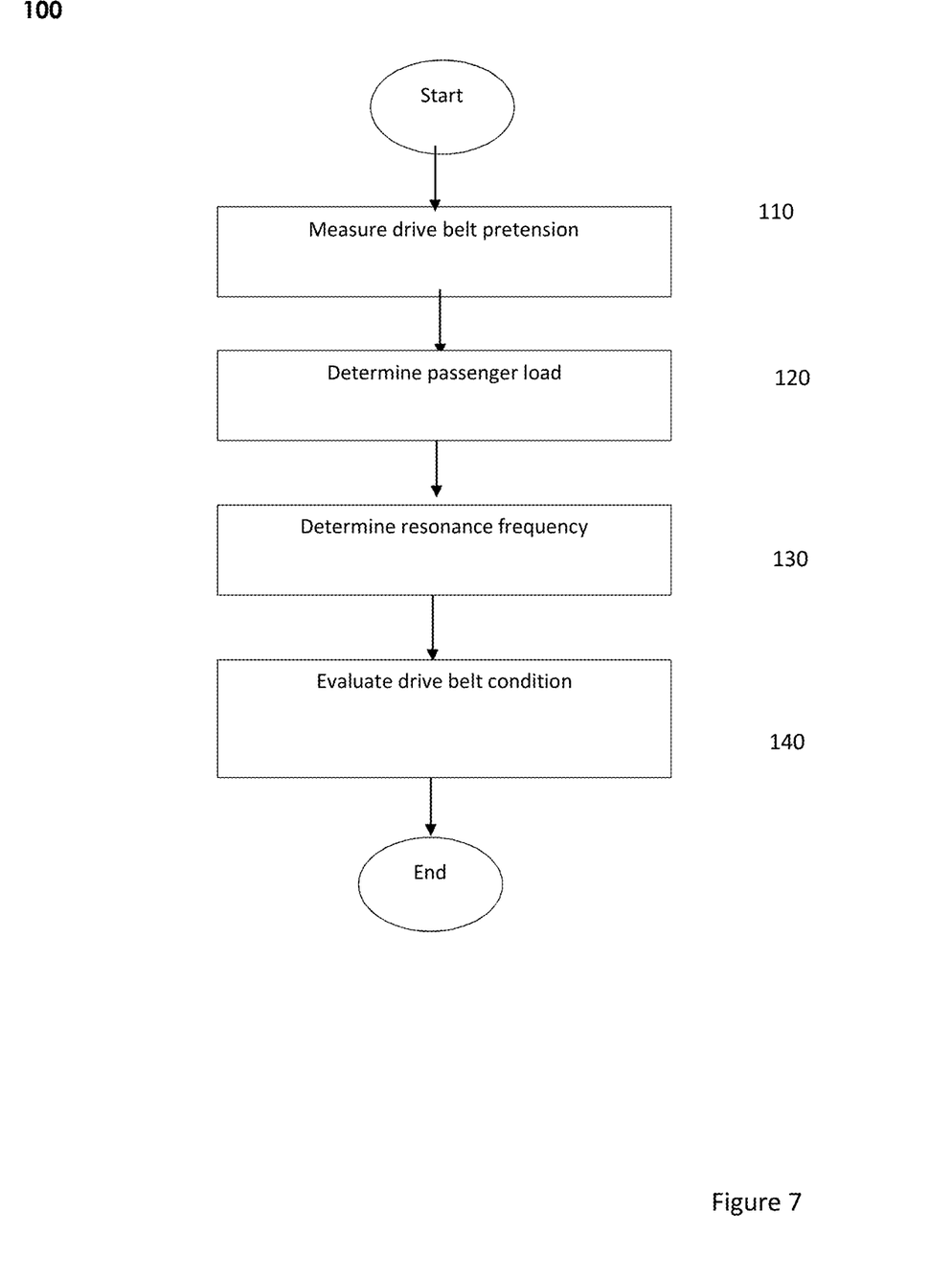
FIG. 7 shows a method of monitoring a drive belt of a passenger conveyor of an exemplary method of the present disclosure.

A method 100 of monitoring a drive belt of a passenger conveyor 10 is schematically represented in FIG. 7.

During operation of the passenger conveyor 10, the tension carriage 40 engages with and applies a force to the drive belt 30 to ensure that there is an even tension on the drive belt 30 thereby ensuring smooth and even operation of the transportation band 12. In step 110, the first sensor 52 measures the pretension applied to the drive belt 30 and transmits this data to the controller 60. It will be appreciated that the pretension can be applied with any known arrangement, such as using springs and/or by screw tensioning.

The drive belt 30 is driven by the drive pulley 42, which is powered by the drive motor 46. The work done by the drive pulley 42 and/or the drive motor 46 can be measured and used to determine the passenger load on the transportation band 12. In step 120, this is achieved by either monitoring the total torque on the drive shaft 44 of the drive pulley 42, or by monitoring the power consumption of the drive motor 46. The data is transmitted from the second sensor 54 to the controller 60.

It will be appreciated that the drive system 48 may include two or more drive motors 46. With this arrangement, the total power consumption of the drive system 48, i.e. the total power consumption of all the drive motors 46 is monitored. Similarly, it will be appreciated that the total torque on the drive system 48 is monitored.

In step 130, the current (actual) resonance frequency of the drive belt 30 is determined at a location adjacent to the third sensor 56. This is done by measuring disturbances in the air surrounding the drive belt 30 due to vibration of the drive belt 30. This can be done using infrared or acoustic techniques.

During operation of the passenger conveyor 10, the drive belt 30 is continuously subjected to operational stresses due to repeated bending as the drive belt 30 is driven through the upper transition region 5, the lower transition region 3 and around turning points at each end of the passenger conveyor 10, and from contact with other components of the passenger conveyor 10, such as the drive pulley 42 and the conveyance elements 14. The operational stresses on the drive belt 30 cause damage to the wires which make up the one or more cords 36 extending within the drive belt 30. As the wires in the cords 36 become stretched and/or break, the resonance frequency of the drive belt 30 alters. Data relating to the current (or actual) resonance frequency is transmitted to the controller 60.

The controller stores data relating to resonance frequency of the drive belt to establish a record of the historical frequency of drive belt. The controller 60 compares a current resonance frequency to the historical resonance frequency of the drive belt 30 in order to determine how the resonance frequency of the drive belt 30 has changed over time.

In step 140, the controller 60 then uses data from the three sensors 52, 54, 56 to determine a current condition of the drive belt 30.

The current condition of the drive belt 30 is determined as the residual breaking strength of the drive belt 30.

In order to evaluate the condition of the drive belt 30, the controller 60 may determine a current belt breaking strength of the drive belt 30. The current belt breaking strength is understood to mean the belt breaking strength of the drive belt 30 in its current state. As the drive belt 30 becomes more worn, the current belt breaking strength decreases.

The controller 60 may then compare the current belt breaking strength to a predetermined level/threshold, i.e. a minimum belt breaking strength. The minimum belt breaking strength can be determined from the known dimensions of the passenger conveyor 10. The controller 60 may generate an alert if the current belt breaking strength is below the predetermined threshold, i.e. if the current belt breaking strength is below the predetermined minimum breaking strength.

The controller 60 may determine if the current belt breaking strength is unsafe, i.e. if the current belt breaking strength is below a second, predetermined level (an unsafe threshold). If an unsafe drive belt condition is determined, the controller 60 may halt operation of the passenger conveyor. In other words, the controller 60 may determine if the degree of wear of the drive belt 30 is unsafe and if such a condition is determined, the controller 60 may halt operation of the passenger conveyor 10

The method may further comprise a step of transmitting an output from the controller 60 relating to the condition of the drive belt 30 to a remote control station 62 (which could also be referred to as a service centre or remote monitoring station).

The method may further comprise using the output data relating to the condition of the drive belt 30 to predict maintenance and/or repair schedules for the drive belt 30. The method may further include using the output data relating to the condition of the drive belt 30 in a Condition Based Maintenance system.

The data from the second sensor 54 can also be used to monitor the pretension applied by the tension carriage 40. The data relating to the operation of the tension carriage 40 can be used to adjust and optimise the pretension, thereby optimising energy consumption.

Whilst the examples described above relate to escalators, it will be appreciated that the monitoring system can be used for other passenger conveyors having similar components such as moving walkways with drive belts. Belt driven moving walkways are provided with conveyance elements in the form of pallets which are mounted on at least one drive belt, which engages with and is driven by a drive pulley. The drive pulley and drive motor are generally provided at one of the landing regions, and a tension carriage is provided at the other landing region. First and seconds sensors of the monitoring system (as described above) can be mounted in the same way. The third sensor can be mounted at any appropriate location along the conveyance path of the moving walkway.

While the disclosure has been described in detail in connection with only a limited number of examples, it should be readily understood that the disclosure is not limited to such disclosed examples. Rather, the disclosure can be modified to incorporate any number of variations, alterations, substitutions or equivalent arrangements not heretofore described, but which are commensurate with the scope of the disclosure. Additionally, while various examples of the disclosure have been described, it is to be understood that aspects of the disclosure may include only some of the described examples. Accordingly, the disclosure is not to be seen as limited by the foregoing description, but is only limited by the scope of the appended claims.

What is claimed is:

1. A drive belt monitoring system (50) for a passenger conveyor (10) having a drive belt (30) having at least one cord (36) extending longitudinally within the drive belt (30), wherein the monitoring system (50) comprises:
    a first sensor (52) configured to measure the pretension of the drive belt (30);
    a second sensor (54) configured to determine a passenger load on the drive belt (30);
    a third sensor (56) configured to determine the resonance frequency of the drive belt (30); and
    a controller (60) configured to evaluate a condition of the drive belt (30) based on: the measured pretension of the drive belt (30), the determined passenger load of the drive belt (30), and the determined resonance frequency of the drive belt (30).

2. The drive belt monitoring system (50) according to claim 1, wherein the first sensor (52) is a force sensor.

3. The drive belt monitoring system (50) according to claim 1, wherein the second sensor (54) is a torque sensor.

4. The drive belt monitoring system (50) according to claim 1, wherein the third sensor (56) is configured to measure disturbances in the air surrounding the drive belt (30) due to vibration of the drive belt (30).

5. The drive belt monitoring system (50) according to claim 1, further comprising a control station (62) and/or at least one user device (64), and
    wherein the controller (60) is configured to transmit the condition of the drive belt (30) to the control station (62) and/or the at least one user device (64).

6. A passenger conveyor (10) comprising:
    a transportation band (12) for conveying passengers between a first landing region (2) and a second landing region (4),
    at least one drive belt (30) on which the transportation band (12) is mounted, the drive belt (30) being driven by at least one drive motor (46); and
    a drive belt monitoring system (50) according to claim 1.

7. The passenger conveyor (10) according to claim 6, wherein the first sensor (52) is provided at a tension carriage (40) of the drive belt (30).

8. The passenger conveyor (10) according to claim 6, wherein the second sensor (54) is provided:
    at a main drive shaft (44) of the passenger conveyor (10) for measuring the torque on the main drive shaft (44), or
    at the at least one drive motor (46) of the passenger conveyor (10) for measuring the power consumption of the at least one drive motor (46).

9. The passenger conveyor (10) according to claim 6, wherein the third sensor (56) is provided adjacent to the drive belt (30) along a conveyance path (8) of the drive belt (30).

10. The passenger conveyor (10) according to claim 6, comprising a plurality of drive belts (30), wherein each drive belt (30) is provided with a respective drive belt monitoring system (50).

11. A method (100) for monitoring a drive belt (30) of a passenger conveyor (10), the method comprising:
    measuring a pretension of the drive belt (30);
    determining a passenger load on the drive belt (30);

determining a resonance frequency of the drive belt (30);

evaluating a condition of the drive belt (30) based on: the measured pretension of the drive belt (30), the determined passenger load, and the determined resonance frequency of the drive belt (30).

12. The method (100) according to claim 11, wherein determining the resonance frequency of the drive belt (30) comprises measuring disturbances in the air surrounding the drive belt (30) due to vibration of the drive belt (30).

13. The method (100) according to claim 11, wherein determining the passenger load on the drive belt (30) comprises:

determining the torque in a main drive shaft (44) of the passenger conveyor, or measuring the power consumption of at least one drive motor (46) of the passenger conveyor.

14. The method (100) according to claim 11, wherein determining the resonance frequency of the drive belt (30) comprises comparing a current resonance frequency with historical resonance frequency data.

15. The method (100) according to claim 11 further comprising:

transmitting the evaluated condition of the drive belt (30) to a control station (62) and/or a user device (64).

16. The drive belt monitoring system according to claim 1, wherein a plurality of conveyance elements are directly mounted on the drive belt.

\* \* \* \* \*